United States Patent
Huici et al.

(10) Patent No.: US 9,253,098 B2
(45) Date of Patent: Feb. 2, 2016

(54) METHOD FOR OPERATING AN OPENFLOW SWITCH WITHIN A NETWORK, AN OPENFLOW SWITCH AND A NETWORK

(75) Inventors: Felipe Huici, Dossenheim (DE);
Mohamed Ahmed, Heidelberg (DE);
Saverio Niccolini, Heidelberg (DE)

(73) Assignee: NEC EUROPE LTD., Heidelberg (DE)

( * ) Notice: Subject to any disclaimer, the term of this patent is extended or adjusted under 35 U.S.C. 154(b) by 122 days.

(21) Appl. No.: 14/003,524

(22) PCT Filed: Mar. 7, 2011

(86) PCT No.: PCT/EP2011/001115
§ 371 (c)(1),
(2), (4) Date: Sep. 25, 2013

(87) PCT Pub. No.: WO2012/119614
PCT Pub. Date: Sep. 13, 2012

(65) Prior Publication Data
US 2014/0029427 A1    Jan. 30, 2014

(51) Int. Cl.
*H04L 12/803* (2013.01)
*H04L 12/863* (2013.01)
*H04L 12/931* (2013.01)

(52) U.S. Cl.
CPC ............ *H04L 47/125* (2013.01); *H04L 47/623* (2013.01); *H04L 49/205* (2013.01)

(58) Field of Classification Search
None
See application file for complete search history.

(56) References Cited

U.S. PATENT DOCUMENTS

| | | |
|---|---|---|
| 2004/0013089 A1 | 1/2004 | Taneja et al. |
| 2009/0116439 A1 | 5/2009 | Madan et al. |
| 2011/0273988 A1 * | 11/2011 | Tourrilhes et al. ............ 370/237 |
| 2011/0317559 A1 * | 12/2011 | Kern et al. .................... 370/235 |

FOREIGN PATENT DOCUMENTS

EP        1 347 602        9/2003

OTHER PUBLICATIONS

International Search Report dated Jun. 6, 2011, in corresponding PCT application.
Zhen-Kai Wang et al: "Load-Balancing High-Performance Router Testbed Based on OpenFlow and Click". Computational Intelligence and Software Engineering (CISE), 2010 International Conference on, IEEE, Piscataway, NJ, USA. Dec. 10, 2010. pp. 1-4. XP031841371. ISBN: 978-1-4244-5391-7 p. 1.

* cited by examiner

*Primary Examiner* — Diane Lo
(74) *Attorney, Agent, or Firm* — Young & Thompson

(57) ABSTRACT

For allowing a very flexible scheduling of data flows within an OpenFlow (OF) switch a method for operating an OpenFlow switch within a network includes using the OpenFlow switch to direct arriving data flows out of different ports of the OpenFlow switch. The method is characterized in that a scheduling mechanism for performing at least one scheduling task is assigned to the OpenFlow switch, wherein a metric will be used to assign weights to the arriving data flows and wherein the data flows will then be scheduled based on the assigned weights and based on a scheduling policy. Further, a corresponding OpenFlow switch and a corresponding network are described, preferably for carrying out the above mentioned method.

11 Claims, 1 Drawing Sheet

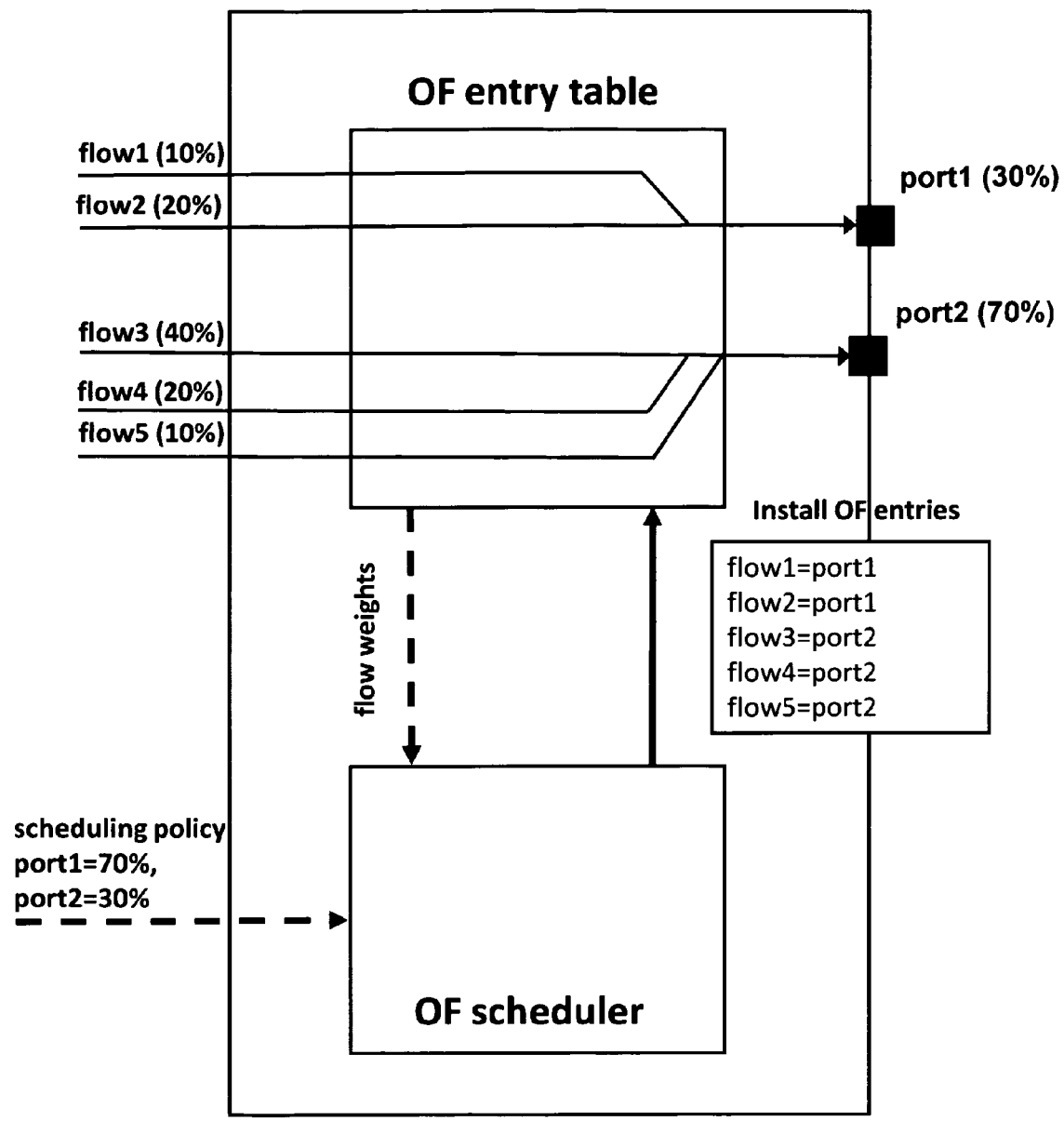

METHOD FOR OPERATING AN OPENFLOW SWITCH WITHIN A NETWORK, AN OPENFLOW SWITCH AND A NETWORK

The present invention relates to a method for operating an OpenFlow (OF) switch within a network, wherein the OpenFlow switch is used to direct arriving data flows out of different ports of the OpenFlow switch. Further, the present invention relates to an according OpenFlow switch and to a network comprising an according OpenFlow switch.

BACKGROUND OF THE INVENTION

The popularity of the OpenFlow protocol, see "The OpenFlow Switch Consortium", http://www.openflowswitch.org/, and of the switches that implement it is growing considerably. OpenFlow provides a mechanism for classifying flows and sending them out a switch's various ports. In greater detail, the switch contains a table made up of OpenFlow entries (OF entries), each of these consisting of a filter used to match flows and an action used to decide what to do with a flow that matches the filter and associated flow counters (bytes, packets, etc.).

Regarding current state of the art, the document "Automated and Scalable QoS Control for Network Convergence", in proceedings of the 2010 internet network management conference on Research on enterprise networking, San Jose, Calif., USA, is providing QoS (Quality of Service) in OpenFlow switches by assuming the existence of per-flow rate-limiters and dynamic priority assignment in hardware.

The work in "DevoFlow: Cost-Effective Flow Management for High Performance Enterprise Networks", in proceedings of the ninth ACM Workshop on Hot Topics in Networks (HotNets-IX), looks at using a centralized controller in order to provide QoS across a set of OpenFlow switches. The work does not focus nor mention how individual switches would implement QoS policies.

In "Adaptive QoS Mechanism for OpenFlow-based NetFPGA Network", Yu-Yuan Tseng, Master's Thesis, the author presents a system built on a NetFPGA board and OpenFlow that implements weighted fair queuing (WFQ). However, the system does not use OpenFlow mechanisms, e.g., install/delete entries, nor does it provide a flap damping mechanism.

The current OpenFlow specification—"OpenFlow Switch Specification, Version 1.0.0 (Wire Protocol 0x01)", http://www.openflowswitch.org/documents/openflow-spec-v1.0.0.pdf—mentions a very crude QoS mechanism whereby packets belonging to flows are sent to queues attached to ports, and operators are then able to set a minimum bandwidth on each queue. Future versions of OpenFlow might support more refined QoS mechanisms such as a minimum or maximum rate, or a strict level of precedence, see "Flow Service Classification", OpenFlow Wiki, http://www.openflowswitch.org/wk/index.php/Flow-Service_Classification.

Even so, these are not as flexible as a general flow scheduling mechanism nor will future OpenFlow specifications indicate how to implement such mechanisms. In "Hedera: Dynamic Flow Scheduling for Data Center Networks", in proceedings of NSDI 2010, the authors present a flow scheduling algorithm. However, this work has very different goals from those of this invention: the paper uses heuristics to maximize the bandwidth used in a data center network, whereas the present invention focuses on a single OpenFlow switch.

Finally, the work in "BGP Route Flap Damping", IETF RFC 2439, http://www.ietf.org/rfc/rfc2439.txt, describes route flap damping mechanisms in the context of BGP (Border Gateway Protocol) routes.

It is an object of the present invention to improve and further develop a method for operating an OpenFlow switch within a network, an OpenFlow switch and an according network for allowing a very flexible scheduling of data flows within an OpenFlow switch.

SUMMARY OF THE INVENTION

In accordance with the invention, the afore mentioned object is accomplished by a method, by an OpenFlow switch, and by an according network in accordance with the description that follows and the accompanying claims.

According to the invention, a method is characterized in that a scheduling mechanism for performing at least one scheduling task is assigned to the OpenFlow switch, wherein a metric will be used to assign weights to the arriving data flows and wherein the data flows will then be scheduled based on said assigned weights and based on a scheduling policy.

Further according to the invention, an OpenFlow switch is characterized in that a scheduling mechanism for performing at least one scheduling task is assigned to the OpenFlow switch, wherein a metric will be used to assign weights to the arriving data flows and wherein the data flows will then be scheduled based on said assigned weights and based on a scheduling policy.

Yet further according to the invention, a network comprises the OpenFlow switch according to the invention.

According to the invention it has been recognized that it is possible to allow for a very flexible scheduling of data flows within an OpenFlow switch by assigning a scheduling mechanism for performing at least one scheduling task to the OpenFlow switch. Concretely, a suitable metric will be used to assign weights to the arriving data flows. After such an assignment the data flows will be scheduled based on said assigned weights and further based on a scheduling policy. The metric can be selected depending on the desired scheduling task. The suitable selection of the respective metric and scheduling policy is providing the basis for performing the desired scheduling task. Thus, a very flexible scheduling of data flows within an OpenFlow switch is possible.

Within a preferred embodiment weights could be assigned to a predetermined set of data flows. Depending on the individual situation a selected and predetermined set of data flows could be scheduled according to the inventive method. The remaining data flows could be conventionally directed out of different ports of the OpenFlow switch.

For performing a reliable scheduling the scheduling policy could be matched to the scheduling task. The support of different scheduling tasks is possible by means of the inventive method. Preferred scheduling tasks could comprise load-balancing or weighted fair queuing within the network.

A preferred scheduling policy could effect that predefined percentages of data flows will be directed out of predefined different ports. For example, the scheduling policy could comprise the rule that 30% of the weights are assigned to a port 1 and 70% to a port 2 of the OpenFlow switch. However, other percentages and the distribution of the data flows to more than two ports are possible depending on the individual situation.

With regard to a very simple metric, the metric could be "packets per second". In this case, the weight would simply be the average number of packets per second that the data flow contains. When using this basic metric the statistics of the OpenFlow switch could be used for obtaining the amount of "packets per second". Thus, no further element or device has to be provided for measuring the flow's weight for fulfilling the metric.

Within a further preferred embodiment an OF scheduler could monitor the data flows and/or assign the weights to the data flows. In other words, such an OF scheduler could measure a flow's weight and could assign the weights to the data flows. In case of use of the metric "packets per second" the OF scheduler could obtain the flows' weights from the statistics of the OpenFlow switch and only has to assign the weights to the data flows. The measuring functionality is off-loaded from the OF scheduler in this case.

Depending on the individual situation the OF scheduler could be provided within or could be assigned to an OpenFlow controller. With regard to a better performance the OF scheduler could be provided within or could be assigned to the OpenFlow switch. In this case, the OF scheduler could be implemented within an embedded component of the OpenFlow switch, such as a network processor.

With regard to a very effective scheduling procedure the OF scheduler—on the basis of the weights and the scheduling policy—could periodically generate a set of OpenFlow operations to install and/or remove entries, such that the OpenFlow operations' result is complying with the scheduling policy. In other words, the periodic generation of OpenFlow operations will result in a periodic installing and/or removing of entries.

Within a preferred embodiment the OF scheduler could calculate a difference (delta) between already installed entries and those entries that would actually comply with this scheduling policy, in order to minimize the number of modifications to be done to an OpenFlow switch's OF entry table. Further preferred, the OF scheduler could perform a series of calculations to determine the minimal set of OpenFlow operations that achieve the scheduling policy. As a result, not all already installed entries have to be wiped after the generation of a new set of OpenFlow operations. Within a concrete embodiment the calculations could be based on heuristics to determine the minimal set of OpenFlow add/delete operations that achieve the given scheduling policy.

The above minimizing procedure could result in having to shift the ports that some flows go out on. However, the OpenFlow operations will likely be used in an in-network scenario so that this shifting will not break TCP (Transmission Control Protocol) connections.

For reducing the number of required OpenFlow install/delete operations the OF scheduler could perform the calculations under acceptance of a definable margin of error regarding complying with the scheduling policy. In other words, in some cases it might not be necessary to achieve the scheduling policy at an exact defined amount. For example, achieving 29% instead of the predetermined 30% of the flows being directed to a predetermined port could be sufficient for a good performance within the network. Thus, resources which might be necessary for reaching the amount of 30% could be saved for other tasks within the network.

For reliably performing such calculations under acceptance of a definable margin of error the OF scheduler could use a variant of the Value at Risk (VaR) measure within the calculations.

Within a further preferred embodiment the OF scheduler could provide a flap damping mechanism for damping a potential flapping of OpenFlow operations. Such a damping mechanism could avoid a continuous installing and removing of the same set of OpenFlow entries during successive calculation runs.

For providing an effective flap damping mechanism the OF scheduler could include a logic that keeps track of OpenFlow operations in previous periods. In other words, the OF scheduler could comprise statistics of OpenFlow operations as an input into the flap damping mechanism.

As the CPU (Central Processing Unit) on OpenFlow switches has limited power and thus install/delete operations can be costly, it is preferred to achieve the general scheduling goals while keeping the amount of required install/delete operations as low as possible.

Current OpenFlow switches do not provide any sort of general scheduling mechanism for performing scheduling tasks such as load-balancing or weighted fair queuing which are very useful features in network equipment.

The present invention provides general flow scheduling based on existing capabilities of OpenFlow switches making no assumptions about additional capabilities. According to a preferred method an OpenFlow switch is taking as input a policy specifying general flow scheduling parameters and transforming it into sets of add/delete OpenFlow entry operations.

A preferred embodiment of the invention is providing a method for general flow scheduling in an OpenFlow switch, whereby general flow scheduling means that flows can be given a weight based on different kinds of metrics, e.g., packets per second, and then scheduled based on those weights, e.g., for a set of weighted flows send a sub-set of them representing 30% of the weights out one port and 70% to another.

Further, a mechanism for efficiently calculating OpenFlow install/delete operations based on currently-installed entries subject to scheduling policies can be provided. The present invention can further provide a mechanism for reducing the number of required OpenFlow install/delete operations while complying, within a margin of error, to a specified scheduling policy and a mechanism for damping the potential flapping of OpenFlow install/delete operations.

The invention provides a method for implementing general flow scheduling on existing OpenFlow switches, e.g., by using off-the-shelf OF entries and flow counter management framework.

The invention does so while minimizing the number of OpenFlow install/delete operations required and prevents flapping of such operations.

Current offerings and proposals in the literature provide only very crude QoS mechanisms or assume the existence of additional hardware support. This invention implements general flow scheduling on currently available OpenFlow switches. Further, the OpenFlow specification does not provide for such a mechanism, nor do discussions about future OpenFlow specification versions.

There are several ways how to design and further develop the teaching of the present invention in an advantageous way. To this end, it is to be referred to the patent claims subordinate to patent claim 1 on the one hand and to the following explanation of preferred examples of embodiments of the invention, illustrated by the drawing on the other hand. In connection with the explanation of the preferred embodiments of the invention by the aid of the drawing, generally preferred embodiments and further developments of the teaching will we explained. In the drawing the only FIGURE is showing schematically an example of a flow scheduling according to an embodiment of the present invention.

An embodiment of the invention provides a method for performing global flow scheduling within a single OpenFlow switch subject to the constraints that naturally arise from this protocol. Such a mechanism would be useful in scenarios where in-network processing is needed, whereby, for example, the OpenFlow switch is used as a way to flexibly direct traffic out different ports connected to flow processing boxes, e.g., firewalls, IDS, network monitors, lawful interception, etc. In particular:

1. This solution provides a method for general flow scheduling in an OpenFlow switch. For example, flows can be given a weight based on different kinds of metrics (e.g., packets per second), and then scheduled based on those weights (e.g., for a set of weighted flows send a sub-set of them representing 30% of the weights out one port and 70% to another).

2. The solution supports the above method by mapping general flow scheduling to a set of OF entries to install and remove. Applying these operations ensures compliance with the desired scheduling.

3. The solution outlines the need to achieve the flow scheduling goals while minimizing the number of install and remove operations; such operations tax the limited power of the CPU in OpenFlow switches. As part of the process, the invention also provides a damping mechanism that ensures that an entry is not installed and removed constantly in quick succession in order to (too) accurately meet a certain scheduling requirement.

In greater detail, the scenario begins when some flows, which we assume will need a certain kind of scheduling, arrive at an OpenFlow switch. A processing entity called the OF Scheduler, which could be realized using the external OpenFlow controller or perhaps even a network processor chip integrated in the OpenFlow switch, continually monitors the flows and assigns weights to them. The metric used to assign weights can vary depending on the type of scheduling needed; for instance, a very simple metric could be packets per second, in which case the weight would simply be the average number of packets per second that a flow contains. It is worth noting that when using this basic metric the switch statistics implemented as part of the OpenFlow can be used to measure a flow's weight, off-loading this functionality from the OF Scheduler.

With this continuous monitoring and weighting in place, the OF scheduler periodically runs a process that takes as input the weights assigned to flows as well as the desired scheduling policy. The scheduler then matches these and produces a set of OpenFlow operations to install and remove entries, such that the operations result in the OpenFlow switch complying with the specified scheduling policy.

DETAILED DESCRIPTION OF THE PREFERRED EMBODIMENTS

The only FIGURE shows an example of how the basic mechanism works. In this case we assume that the metric in use is natively supported by OpenFlow, e.g., packet rate, and so the flow metrics are gathered by the OpenFlow chip. The picture further shows the case where the OF scheduler is implemented within an embedded component of the OpenFlow switch (such as a network processor), but as explained above could also be realized in the OpenFlow controller, even if with decreased performance. In this scenario five different flows arrive at the OpenFlow switch where they are assigned different weights shown as percentages. These percentages are reported to the OF scheduler which also receives scheduling policies as input—70% of the weight of flows, according to the given metric, should go to port 1, the remaining 30% to port 2. The OF scheduler then performs a set of calculations and issues the installation of five OpenFlow entries.

As mentioned, the OF scheduler performs a calculation in order to arrive at the necessary OpenFlow operations to comply with a given scheduling policy. More specifically, the scheduler generates this set of operations subject to the following three considerations:

1. In all likelihood, at any one point in time the OpenFlow switch will already have a set of OF entries installed in it. While it would be possible to completely wipe all entries related to the set of flows and install new entries that comply with the scheduling policy, this would be highly inefficient. Instead, the scheduler calculates the delta between the current entries and those that would comply with the desired scheduling policy in order to minimize the number of modifications done to the switch's OF entry table. In greater detail, the scheduler performs a series of calculations based on heuristics to determine the minimal set of OpenFlow add/delete operations that achieve the requested scheduling policy. This might result in having to shift the ports that some flows go out on, but note that the mechanism will likely be used in an in-network scenario so that this shifting will not break TCP connections. Also note that this patent treats flows as atomic, in other words, a flow cannot be split by the switch; this is because currently the OpenFlow protocol does not support such a mechanism.

For example, assume we have the set up shown in FIG. 1, with 30% of the weights assigned to port 1 and 70% to port 2. Further assume that now a new scheduling policy arrives requiring the division of work to be 40% for port 1 and 60% for port 2. While it would be possible to erase the 5 existing OpenFlow entries and install flow3=port1
flow1=port2
flow2=port2
flow4=port2
flow5=port2 this would require wiping the entire OpenFlow table and re-installing entries, a wasteful procedure. Instead, in our example the OF scheduler would issue the removal of the entry flow5=port2 followed by the addition of the entry flow5=port1 achieving the required scheduling policy without needing to erase the entire OpenFlow entry table.

2. The scheduler minimizes OpenFlow install and remove operations that tax the limited power of the OpenFlow switch's CPU. To do so, note that there is an inherent trade-off between (1) how often the scheduler runs this scheduling process and how many OpenFlow operations it issues and (2) how closely the resulting OF entries comply with the desired scheduling policy. For example, assume that a given policy states that 30% of the flows' weights should go out a certain port. Further assume that during one of its runs the scheduler determines that in fact only 29% of the weight is actually exiting through the port; the scheduler might then decide not to issue any OpenFlow install/remove operations, since it deems the cost of running this operation too high compared to the small gain of closely complying with the stated scheduling policy.

The issue of determining whether to run such a policy boils down to understanding the trade-off between the cost and benefits of applying the policy. Such tasks are often formulated as standard mathematical programming problems—linear or otherwise—which define the problem in terms of an objective function with one or more variables and a set of constraints associated with it. One possible candidate for this task is a variant of the Value at Risk (VaR) measure, a technique that is widely applied in the financial sector. VaR models are typically applied in portfolio analysis optimization and aim to capture the worst expected loss of portfolio over a given time interval.

For example, in order to evaluate the performance of the scheduler we first define a utility model and a set of constraints for it. The performance of the scheduler—its utility—can be defined as how well it conforms to the goal set by a given policy. For example, if the policy states that 30% of the flows' weights should go out a certain port and in practice only 29% of the weights is actually exiting through the port, the scheduler could assign it a utility of 29/30 or conversely a performance deficit of 1—29/30. Further, if we define the cost of achieving the goal as the amount of work required to deplete the deficit, i.e., the CPU cost, then we can present the problem as a VaR optimization where the acceptable loss/gain gives a cut-off threshold. For example, reschedule only when we expect at least a 10% gain in performance/policy compliance.

3. The scheduler provides a flap damping mechanism: depending on the scheduling policy and the changing weights of flow, it is possible to arrive at scenarios where the scheduler continually installs and removes the same set of OpenFlow entries during each of its runs, i.e., flapping between these entries being installed or not. The scheduler provides a mechanism that reduces the amount of flapping, in essence performing no operations during certain runs.

For instance, suppose that a given set of flows have relatively stable long-term weights but their short-term weights vary. In this scenario, if the OF scheduler were to run too often, it would pick up these variations and constantly try to modify the OpenFlow entries in the table, creating flapping. Note that it would not be possible to simply reduce the frequency at which the OF scheduler runs, since this frequency affects all flows in the system and so should not be tailored to only a few. To cope with the flapping, the OF scheduler includes logic that keeps track of OpenFlow operations—i.e., installation and deletion of OpenFlow entries—in previous periods in order to check and prevent flapping patterns.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for operating an OpenFlow (OF) switch within a network, wherein the OpenFlow switch is used to direct arriving data flows out of different ports of the OpenFlow switch, comprising:
    assigning a scheduling mechanism for performing at least one scheduling task to the Open Flow switch,
    wherein a metric is used to assign weights to the arriving data flows,
    wherein the data flows are then scheduled based on said assigned weights and based on a scheduling policy,
    wherein an OF scheduler monitors the data flows and/or assigns the weights to the data flows,
    wherein the OF scheduler performs a series of calculations to determine the minimal set of Open Flow operations that achieve the scheduling policy, and
    wherein the OF scheduler is using a variant of the Value at Risk (VaR) measure within the calculations.

2. The method according to claim 1, wherein the calculations are based on heuristics.

3. The method according to claim 1, wherein the OF scheduler performs the calculations under acceptance of a definable margin of error regarding complying with the scheduling policy.

4. An OpenFlow (OF) switch, capable of carrying out the method for operating an OpenFlow switch within a network according to claim 1, wherein the OpenFlow switch is used to direct arriving data flows out of different ports of the OpenFlow switch, comprising:
    a scheduling mechanism for performing at least one scheduling task is assigned to the OpenFlow switch,
    wherein a metric is used to assign weights to the arriving data flows,
    wherein the data flows are then scheduled based on said assigned weights and based on a scheduling policy,
    wherein an OF scheduler monitors the data flows and/or assigns the weights to the data flows,
    wherein the OF scheduler performs a series of calculations to determine the minimal set of Open Flow operations that achieve the scheduling policy, and
    wherein the OF scheduler is using a variant of the Value at Risk (VaR) measure within the calculations.

5. A network, comprising an Open Flow (OF) switch according to claim 4.

6. A method for operating an OpenFlow (OF) switch within a network, wherein the OpenFlow switch is used to direct arriving data flows out of different ports of the OpenFlow switch, comprising:
    assigning a scheduling mechanism for performing at least one scheduling task to the OpenFlow switch,
    wherein a metric is used to assign weights to the arriving data flows,
    wherein the data flows are then scheduled based on said assigned weights and based on a scheduling policy,
    wherein an OF scheduler monitors the data flows and/or assigns the weights to the data flows, and
    wherein the OF scheduler provides a flap damping mechanism for damping a potential flapping of OpenFlow operations.

7. The method according to claim 6, wherein the calculations are based on heuristics.

8. The method according to claim 6, wherein the OF scheduler performs the calculations under acceptance of a definable margin of error regarding complying with the scheduling policy.

9. The method according to claim 6, wherein the OF scheduler is using a variant of the Value at Risk (VaR) measure within the calculations.

10. An OpenFlow (OF) switch, capable of carrying out the method for operating an Open Flow switch within a network according to claim 6, wherein the OpenFlow switch is used to direct arriving data flows out of different ports of the Open Flow switch, comprising:
    a scheduling mechanism for performing at least one scheduling task is assigned to the OpenFlow switch,
    wherein a metric is used to assign weights to the arriving data flows,
    wherein the data flows are then scheduled based on said assigned weights and based on a scheduling policy,
    wherein an OF scheduler monitors the data flows and/or assigns the weights to the data flows, and wherein the OF scheduler provides a flap damping mechanism for damping a potential flapping of OpenFlow operations.

11. A network, comprising an OpenFlow (OF) switch according to claim 10.

* * * * *